April 3, 1945.  H. A. BARNBY ET AL  2,372,646
CONVEYING MECHANISM
Filed Dec. 7, 1942  2 Sheets-Sheet 1
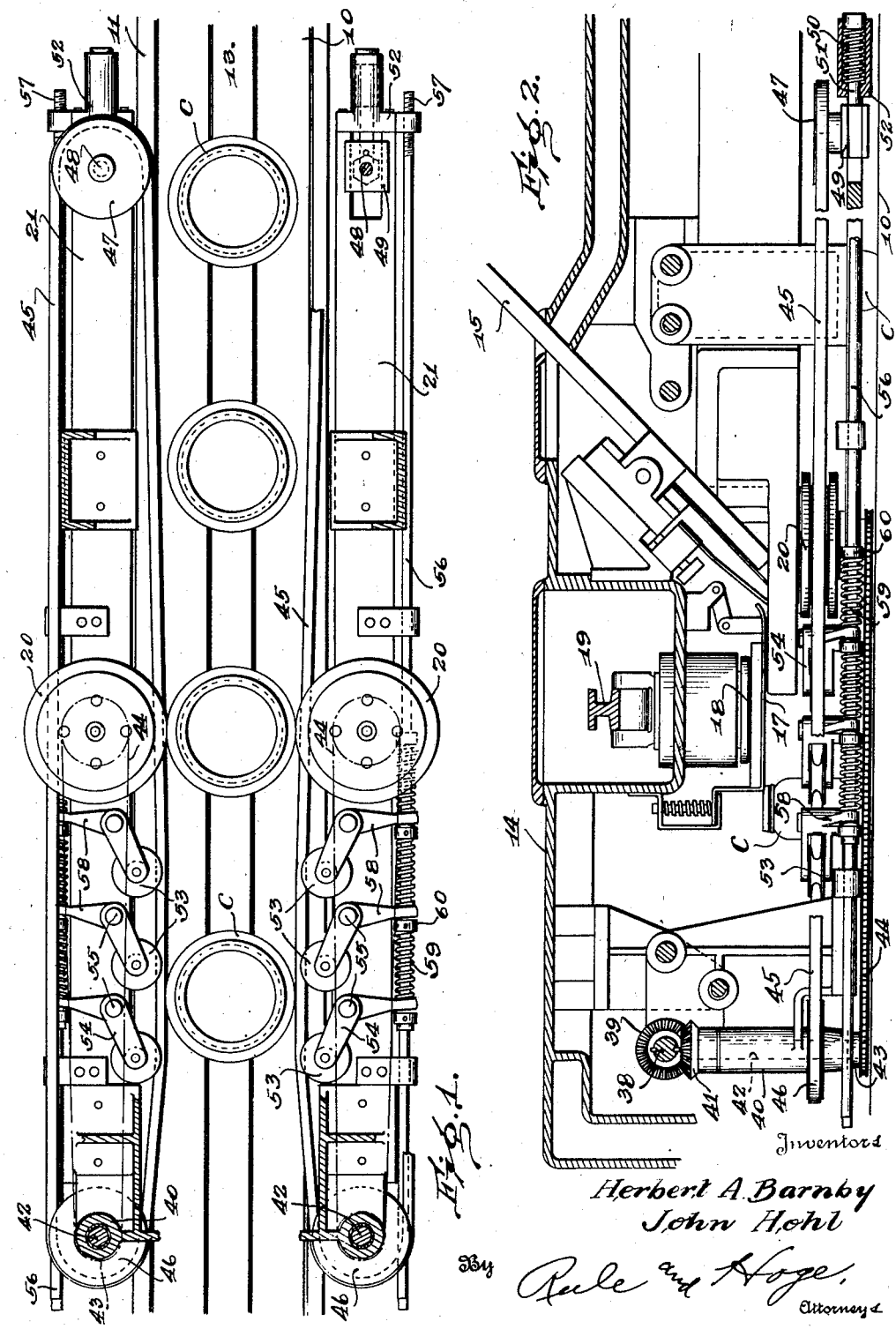
Inventors
Herbert A. Barnby
John Hohl
By Rule and Hoge
Attorneys April 3, 1945.  H. A. BARNBY ET AL  2,372,646
CONVEYING MECHANISM
Filed Dec. 7, 1942   2 Sheets-Sheet 2

Inventors
Herbert A. Barnby
John Hohl
By Rule and Hoge
Attorneys

Patented Apr. 3, 1945

2,372,646

UNITED STATES PATENT OFFICE 2,372,646

CONVEYING MECHANISM

Herbert A. Barnby and John Hohl, Toledo, Ohio, assignors to Owens-Illinois Glass Company, a corporation of Ohio Application December 7, 1942, Serial No. 468,096

4 Claims. (Cl. 198—165)

Our invention relates to apparatus for conveying articles such as bottles, jars, or other containers to and through an assembling station where caps or closure devices are placed on the containers, sealing the closure devices on the containers and advancing them beyond the sealing station.

An object of the invention is to provide in combination with the continuously traveling conveyor a sealing ram or device for pressing the caps into sealing engagement with the containers and means for quickly starting the sealed containers forward with the conveyor after the sealing operation, during which their forward travel has been arrested momentarily.

Other objects of the invention will appear hereinafter.

Referring to the accompanying drawings:

Fig. 1 is a part-sectional plan view of an apparatus embodying our invention.

Fig. 2 is a longitudinal sectional elevation of the apparatus.

Figure 3:
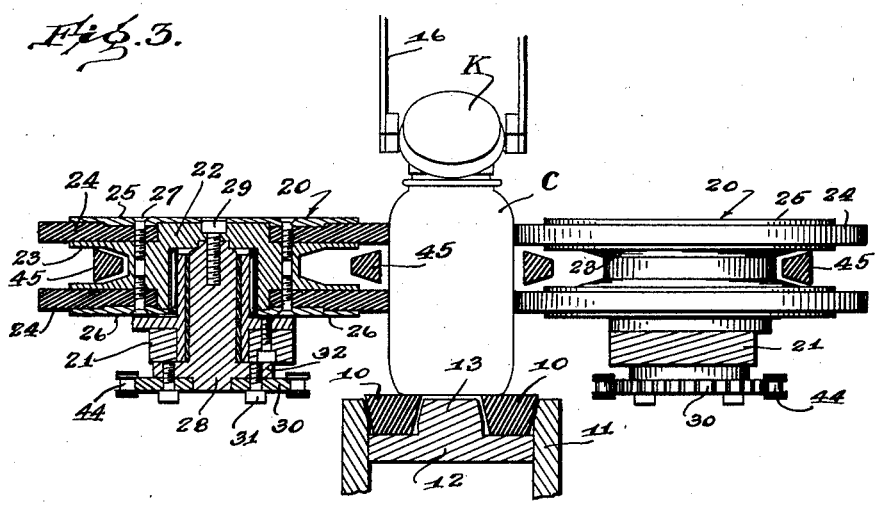
Fig. 3 is a cross-sectional view showing the gripping rolls for gripping the container while a cap is being drawn thereby from a chute or holding device onto the container.

The apparatus as herein disclosed forms part of a jar capping and sealing machine such as illustrated and described in the copending application of John Hohl for "Capping machines," Serial No. 468,095, filed December 7, 1942, and issued September 12, 1944, as Patent No. 2,357,826, and the copending joint application of Hohl and Bjering for "Jar capping apparatus," Serial Number 468,094, filed December 7, 1942. The present application discloses subject matter described and claimed in said copending applications.

Referring to the drawings, the apparatus includes a horizontally disposed, continuously traveling belt conveyor comprising a pair of belts 10 supported on a conveyor frame including side rails 11 and a bottom supporting plate or rail 12 formed with a central longitudinal rib 13. The containers C, herein shown and referred to as jars, are placed on the conveyor at one end of the machine and continuously advanced through the machine except while momentarily arrested by the sealing ram as hereinafter described.

The apparatus includes a casing 14 in which is mounted a downwardly and forwardly inclined chute 15 through which the caps K or closure devices are fed to the containers. At the lower end of the chute is a pair of spring gripping or holding arms 16 by which the caps are held in an inclined position (Fig. 3) with the lower portion of the cap projected into the path of the containers C. Each container as it advances, engages a cap and withdraws it from the arms 16 leaving the cap loosely supported on the container. A stationary plate or shoe 17 (Fig. 2) positioned forwardly of the chute, is arranged to engage the cap and hold it with a yielding pressure in place on the container as the latter advances beyond the chute.

The cap is forced into sealing position on the container by a ram 18 which is periodically reciprocated vertically by means of a cam actuated operating lever 19. The container is momentarily arrested by the plunger, the stationary rib 13 providing a bottom support for the container while the cap is pressed into sealing engagement with the container.

Means for gripping the container when it reaches the cap transfer position and assuring its continued forward movement by which the cap is withdrawn from the holding arms 16, includes a pair of gripping rolls 20 arranged to to engage the opposite side walls of the container. The rolls are mounted on stationary frames 21 which comprise parallel rails extending lengthwise of the apparatus. These rails are positioned at opposite sides of the conveyor frame 11, 12 and at a somewhat level.

Each of the rolls 20 comprises a hub 22 formed with peripheral flanges 23 which provide supporting plates for a pair of disks 24 made of rubber or other soft resilient material. The disks are gripped between the plates 23 and upper and lower clamped plates 25 and 26 attached to the hub by screws 27. Each hub 22 is attached to the upper end of a vertical shaft 28 by means of a screw bolt 29. The shafts 28 are journalled for rotation in the frames 21. Sprocket wheels 30 are attached to the lower ends of the shafts by screw bolts 31 which are threaded into flanges 32 formed on the shafts.

Figure 4:
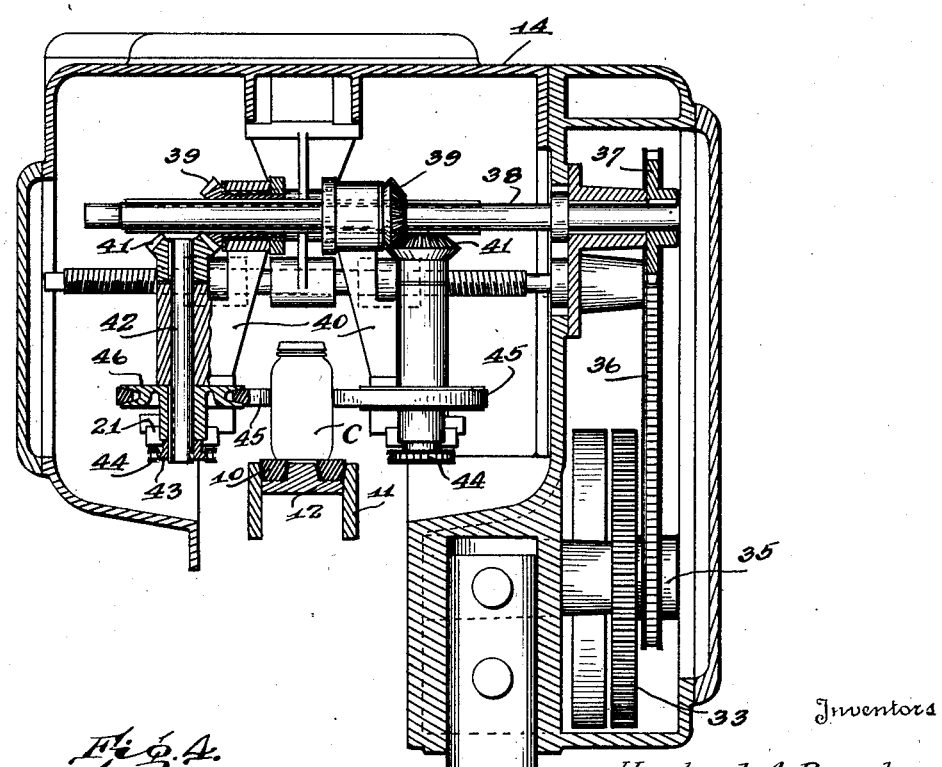
Fig. 4 is a fragmentary cross-sectional elevation of the apparatus.

The rolls 20 are rotated continuously in synchronism with the movement of the conveyor belts 10. Said belts and the rolls 20 may be driven from the same motor operating through power transmitting mechanism. Such mechanism includes a gear 33 (Fig. 4) and a sprocket wheel 35. A sprocket chain 36 is trained over the sprocket wheel 35 and a sprocket wheel 37 keyed to a shaft 38.

Bevel gears 39 splined on the shaft 38 have journalled bearings in a pair of brackets 40. Bevel gears 41 in mesh with and driven by the gears 39, are keyed to the upper ends of vertical shafts 42 journalled in the brackets 40. Sprocket wheels 43 keyed to the lower ends of the shafts 42, drive sprocket chains 44 which are trained over the sprocket wheels 43 and the sprocket wheels 30 (Fig. 3).

A pair of endless side belts 45 are mounted on the frames 21 at opposite sides of the path of the containers. Each belt 45 is trained over a drive pulley 46 keyed to one of the shafts 42, and a driven pulley 47 on a stationary shaft 48. The shaft 48 is carried on an adjusting block 49 slidably mounted in the frame 21. A tension and take-up spring 50 is mounted on a headed rod 51 attached to the block 49 and slidable in an end block 52 of the frame 21. The spring is under tension and maintains a tension on the belt 45.

The side belts 45 are arranged to engage the sides of the containers C after the latter have passed beyond the gripping rolls 26, and serve as a means for quickly starting and accelerating the containers after they have been arrested momentarily at the sealing station. Means for holding the side belts with a yielding pressure against each of the containers in succession, includes a series of pressure rolls 53 associated with each belt. Each of the rolls 53 is journalled on a bell crank 54 mounted to rock on a pivot pin 55 attached to the frame 21. Each frame 21 carries a rod 56 extending lengthwise thereof and having a threaded end portion 57 connected to the end block 52 for lengthwise adjustment of the rod. Each bell crank 54 includes an arm 58. The rod 56 extends through openings in the arms 58 and has mounted thereon coil springs 59 held under compression between said arms 58 and collars 60 keyed to the rod. The springs 59 serve to hold the belts 45 with a yielding pressure against the containers C. The degree of pressure is adjustably regulated by the adjusting rods 56.

By the use of a plurality of pressure rolls 53 arranged at intervals lengthwise of each belt, a substantially uniform yielding pressure may be applied to the containers during their travel through a predetermined zone. These pressure rolls are so positioned and arranged that the belts 45 are brought into engagement with the containers after the latter has passed beyond the holding rolls 20 and by the time the containers have reached the sealing zone where they are arrested by the sealing plunger or ram 18. As the latter is lifted after a sealing operation, the container immediately resumes its forward movement owing to the frictional driving engagement of the side belts therewith under the pressure applied by the spring 59. As the side belts are traveling at the same linear speed as the bottom conveyor belts 10, each container is accelerated to the speed of the bottom conveyor and transferred to its control.

Modifications may be resorted to within the spirit and scope of our invention.

We claim:

1. The combination of a horizontally traveling conveyor forming a bottom support for containers placed thereon and operable to advance the containers along a predetermined path, horizontally traveling conveyor belts spaced above the said conveyor and extending lengthwise thereof, said belts being spaced to permit the passage therebetween of containers supported on and traveling with said conveyor, means for driving said belts in synchronism with the travel of the conveyor, and pressure means for holding the belts with a yielding pressure against opposite sides of containers traveling with said conveyor, said pressure means comprising a series of bell cranks, springs individual to the bell cranks and each engaging and applying pressure to one arm of a bell crank, rolls individual to the bell cranks and each carried by the other arm of the bell crank, said rolls engaging the side belts and holding the latter against the containers on said conveyor, a rod on which said springs are mounted, stops on said rod in position to engage said springs and hold them under compression against the bell cranks, and means for adjusting the rod and thereby adjusting the compression of the springs.

2. The combination of a horizontally traveling conveyor, an endless belt spaced above the conveyor and extending lengthwise thereof, a frame extending lengthwise of the belt, bell cranks mounted on said frame, rolls carried by the bell cranks and arranged to bear against said belt, a rod extending lengthwise of said frame, coil springs mounted on said rod, and stops on the rod, each spring being held under compression between a stop and one arm of the bell crank, the bell cranks being arranged to transmit said pressure through the rolls to said belts.

3. The combination of a continuously traveling horizontal conveyor for advancing containers supported thereon to and beyond a predetermined stopping point, driving means cooperating with said conveyor for starting containers arrested at said point and accelerating the containers to the speed of said conveyor, said driving means comprising side belts positioned above the conveyor and extending lengthwise thereof and spaced apart in position to engage the opposite sides of the containers while the latter are at said stopping point, means for driving said belts in the same general direction and at substantially the same speed as said conveyor, said belts being extended beyond said point in both directions lengthwise of the conveyor, the portions thereof approaching the said point being slightly convergent in a forward direction to bring them into gripping contact with the containers at said point, the belts being substantially parallel from said point forward to retain said gripping contact while the container is advancing beyond said point.

4. The combination of a continuously traveling horizontal conveyor for advancing containers supported thereon to and beyond a predetermined stopping point, driving means cooperating with said conveyor for starting containers arrested at said point and accelerating the containers to the speed of said conveyor, said driving means comprising side belts positioned above the conveyor and extending lengthwise thereof and spaced apart in position to engage the opposite sides of the containers while the latter are at said stopping point, means for driving said belts in the same general direction and at substantially the same speed as said conveyor, said belts being extended beyond said point in both directions lengthwise of the conveyor, the portions thereof approaching the said point being slightly convergent in a forward direction to bring them into gripping contact with the containers at said point, the belts being substantially parallel from said point forward to retain said gripping contact while the container is advancing beyond said point, pressure rolls positioned at intervals along said parallel portions of the said belts, and means for holding each said roll with a yielding pressure against the belt and applying said pressure through the belts to the containers.

HERBERT A. BARNBY.
JOHN HOHL.